United States Patent Office 3,443,520
Patented May 13, 1969

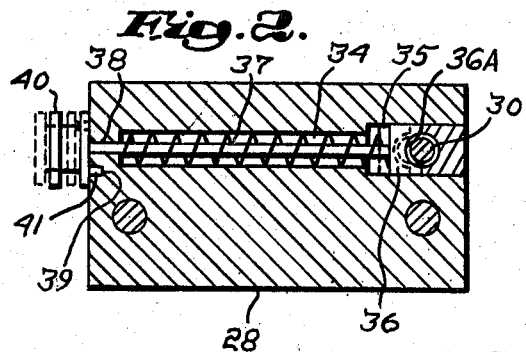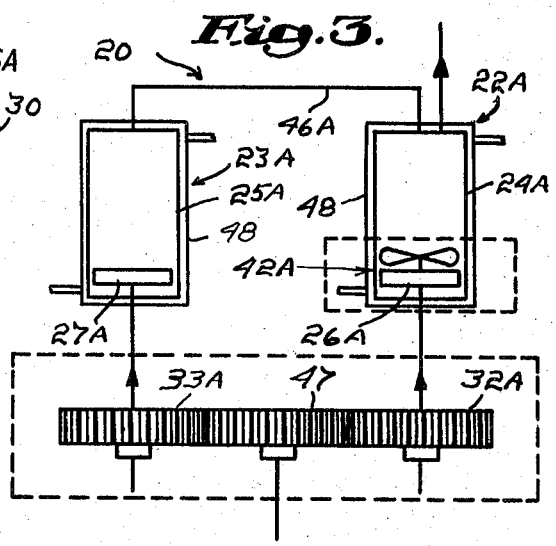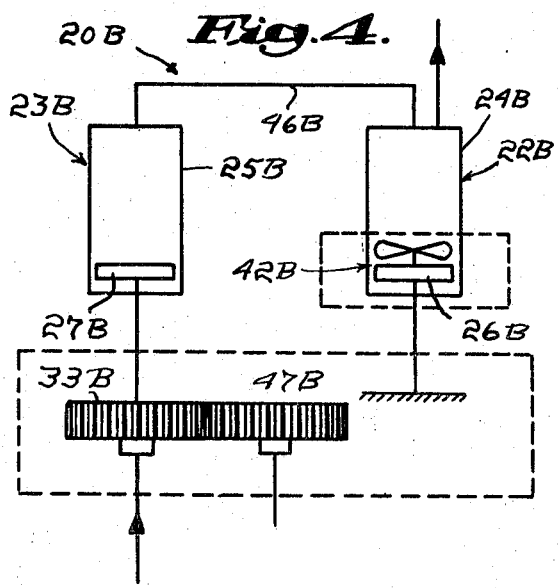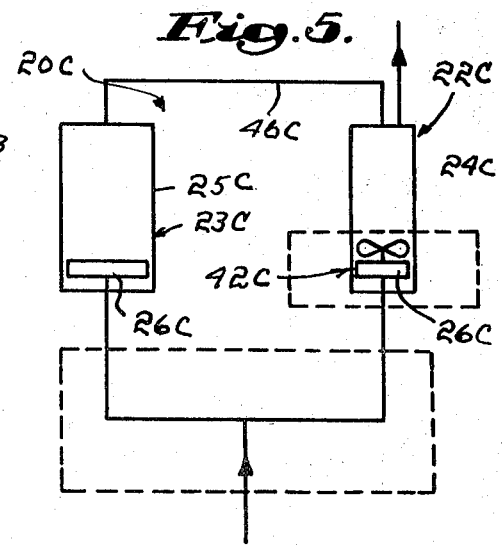

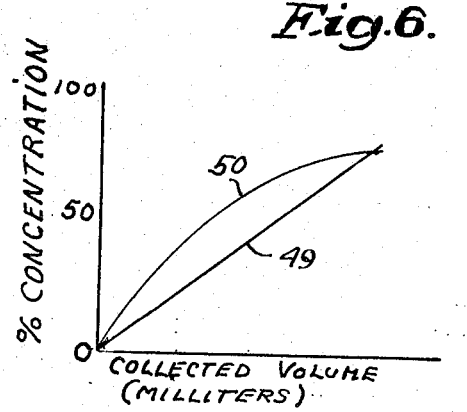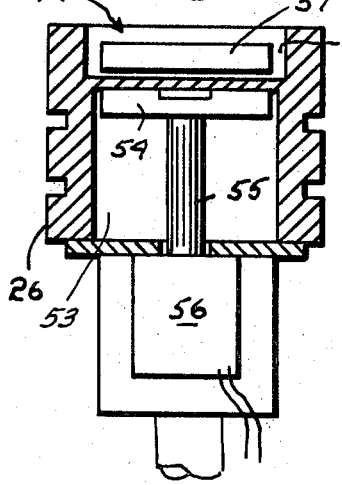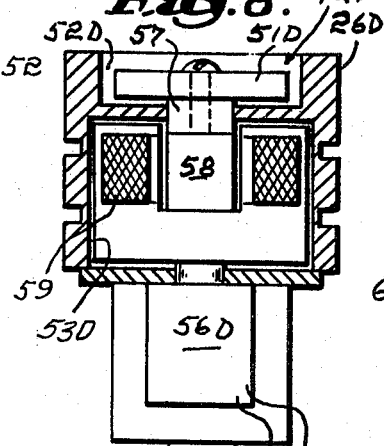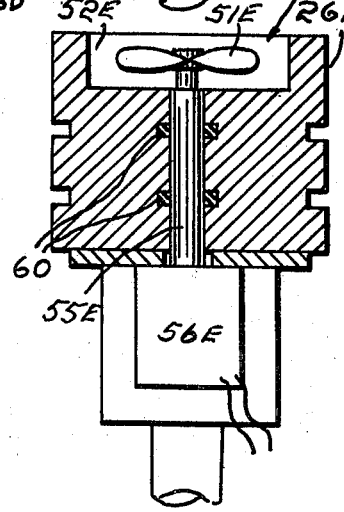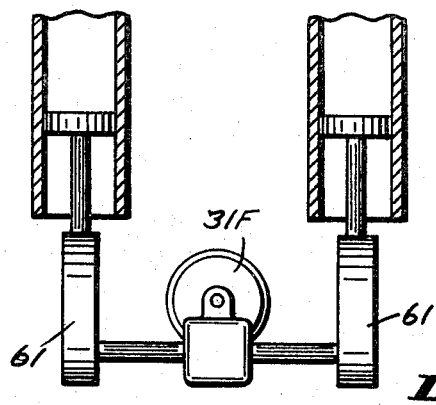

3,443,520
GRADIENT FORMING PUMPS AND METHOD
Samuel Nejame, Jr., Medfield, Mass., assignor to International Equipment Company, Needham Heights, Mass., a corporation of Massachusetts
Filed Sept. 11, 1967, Ser. No. 666,709
Int. Cl. F04b 13/02, 19/06, 21/00
U.S. Cl. 103—6                                  16 Claims

ABSTRACT OF THE DISCLOSURE

Method of and pumps for use in continuously and regularly changing gradients of two different concentrations of a substance by continuously stirring a predetermined volume of one concentration while adding the other concentration thereto at a predetermined flow rate and continuously displacing the stirred and mixed concentrations from that volume with the ratio between the displaced and added volumes being at least one-to-one with or without means for reducing at a predetermined flow rate the volume of concentrations being stirred, the flow rates being the same or different.

---

Figure 1:
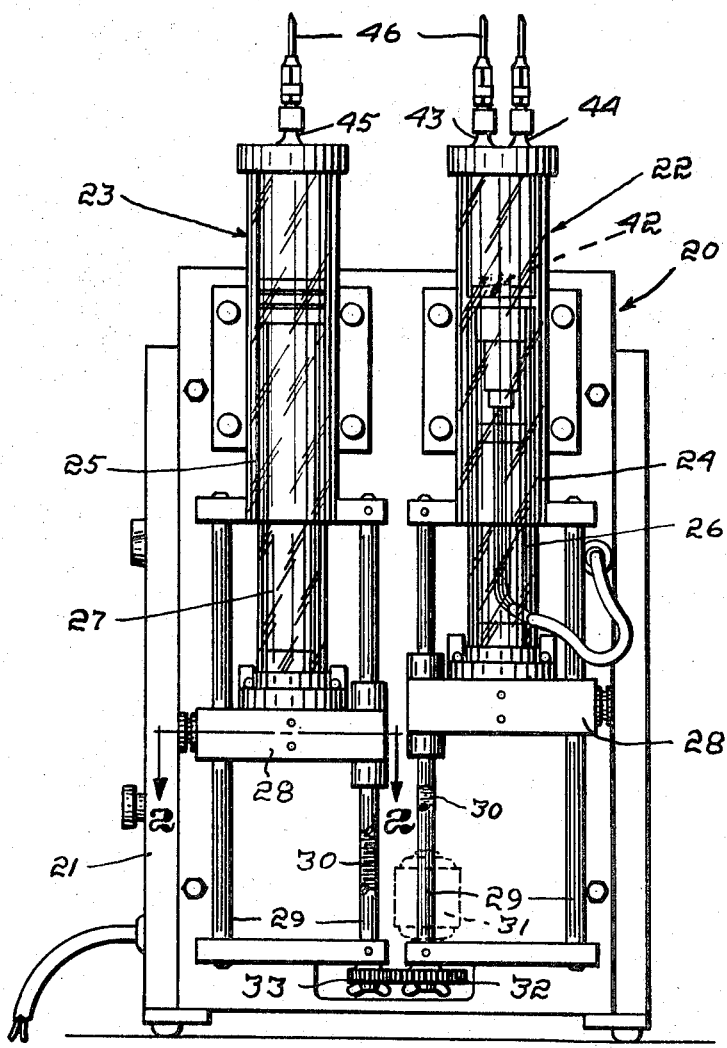

A gradient, as the term is used herein, is a contained liquid whose density increases from top-to-bottom. Gradients are used, for example, in determining the molecular weights of known or unknown particles with the procedure for so doing requiring that the particle be overlaid on a gradient which is then placed in a centrifugal field of a predetermined value for a predetermined length of time thereby to force the particle to penetrate the gradient. The resulting position of the particle in the gradient gives information enabling its molecular weight to be determined if the density of the gradient at the point penetrated by the particle is known.

Gradients are formed from two concentrations of a substance, sucrose, for example, and the term "concentration," as herein used, may mean a zero percentage of the substance. In order to provide the required increase in density from top-to-bottom of the gradient, it is necessary that the two concentrations be mixed with the percentage of one concentration increasing relative to the other as the gradient is formed.

Heretofore, the use of gradients in determining molecular weights, sedimentation rates, and other analyses has been subject to error because it was difficult to determine accurately the value of the gradient at the point or level penetrated by the particle from its supposed position on a theoretical graph line.

The principal objective of the invention is to so form gradients that the gradient concentration or density at any point or level can be accurately predicted. This objective is attained by providing for the formation of a continuously and regularly changing gradient of the difference between first and second concentrations of a substance, either on a linear or an exponential basis. As the term "continuously and regularly changing" implies, gradients in accordance with the invention are the subject of mathematical equations so that they may be graphically represented or determined from volumetric knowledge.

In accordance with the invention, this objective, in terms of method, involves the steps of continuously stirring a predetermined volume of one concentration while continuously adding the other concentration thereto at a predetermined flow rate and displacing for collection, the stirred and mixed concentrations in gradient maintaining form with the ratio between the displaced and added volumes being at least one-to-one.

In one method, the volume being stirred is decreased at a constant flow rate with linear gradients resulting when the flow rate is the same as that of the added concentration and exponential gradients when the ratio between the flow rates is other than one-to-one.

In the case of linear gradients, each gradient is represented by the equation $$C_c = C_h - \left[(C_h - C_o)\left(1 - 2\frac{V}{V_o}\right)\right]^{Rl}$$

wherein $C_c$ is the gradient concentration, $C_h$ is the heavier concentration of the substance, $C_o$ is the lighter concentration thereof, $V_o$ is the initial mixing chamber volume, $V$ is the collected volume, and $Rl$ is the ratio of one-to-one.

In the case of exponential gradients, each is represented by the equation $$C_c = C_h - \left[(C_h - C_o)\left(1 - 2\frac{V}{V_o}\right)\right]^{Rd}$$

with the symbols being the same as those previously described but with $Rd$ being a ratio greater than one-to-one.

In accordance with another embodiment of the invention, the stirred volume is held constant. In that case the gradients are also exponential but each is represented by the equation $$C_c = C_h + (C_o - C_h)e^{-\frac{V}{V_o}}$$

and again, the same symbols are employed with $e$ a natural or Napierian logarithm of the approximate value of 2.71828.

The above indicated general objective is attained with gradient pumps in accordance with the invention, each pump having a chamber dimensioned to contain a predetermined volume of one concentration and having an inlet and an outlet, means in communication with the inlet to deliver into the chamber the other concentration at a predetermined flow rate, and means within the chamber to stir and mix the contents thereof before their displacement through the chamber outlet.

Another objective of the invention is to provide means in control of the chamber to decrease the volume of the chamber at a predetermined flow rate and another objective of the invention is to provide pump operating means providing the same flow rate for both the volume decreasing means and the means adding the second concentration where linear gradients are wanted and different flow rates where exponential gradients are desired. In addition, in another embodiment, the volume of the chamber is held constant during pumping operations.

Yet another objective of the invention is to provide gradient pumps of the type in which the chamber is part of a pumping unit of the piston-cylinder type and desirably the means delivering the second concentration is a pumping unit of the same type. With piston-cylinder pumping units the stirring means may be carried by their pistons advantageously.

Gradients in accordance with the invention are well adapted to meet the requirements of use. Not only does the invention enable a gradient to be so regularly and continuously formed that its concentration or density at a particular level may be mathematically determined with a high degree of accuracy but it also enables such a gradient to be so formed on a repetitive basis and at a rate substantially higher than has hitherto been possible where, at best, small volumes of a gradient were formed at one time.

In this connection, gradient pumps in accordance with the invention are desirably positive displacement in nature in order to be capable of handling concentrations of any density and viscosity. In addition to this factor, such pumps can have at the same time such a volumetric capacity as to meet requirements not only of horizontal bucket centrifugation but also zonal centrifugation.

In the accompanying drawings, there are shown illustrative embodiments of the invention illustrative of these and other of its objectives, novel features, and advantages.

In the drawings:

FIGURE 1 is a front view of a gradient pump in accordance with the invention, the delivered gradients being exponential, FIGURE 2 is a section taken approximately along the indicated lines 2—2 of FIGURE 1, FIGURE 3 is a schematic view of another pump in accordance with the invention, the delivered gradients being linear, FIGURE 4 is a like view of another gradient pump in which the chamber volume is held constant, the delivered gradients being exponential, FIGURE 5 is a like view of yet another pump, one pumping unit being of smaller cross sectional area than the other, the delivered gradients being exponential, FIGURE 6 is a graphic illustration of linear and exponential gradients, FIGURE 7 is a somewhat schematic view illustrating the stirring means of the gradient pump shown in FIGURE 1, FIGURE 8 is a like view of another type of stirring means, FIGURE 9 is a like view of yet another type of stirring means, and FIGURE 10 is a fragmentary view illustrating somewhat schematically another drive for the pumping unit.

In FIGURE 1, a gradient pump, generally indicated at 20, has a support 21 for generally indicated pumping units 22 and 23 and for their operating means.

The pumping units 22 and 23 are both shown as of the type having, respectively, cylinders 24 and 25 fixed to the support 21 and pistons 26 and 27. Each piston has a base 28 secured to its lower end and slidably supported by the vertical guide rods 29.

The pump operating means include a pair of vertical threaded shafts 30 suitably journalled in the support 21, one shaft 30 for each pumping unit and extending upwardly through the base 28 thereof. A motor 31 has a driving gear, not shown, in mesh with a gear 32 fast on the lower end of the shaft 30 for the pumping unit 22 and the gear 32 meshes with a smaller gear 33 fast on the shaft 30 for the pumping unit 23 so that the shafts for the two pumping units are driven at a different rate.

Each base 28 has a threaded connection with the appropriate shaft 30 thus to enable the piston supported thereby to be advanced into the cylinder of the pumping unit of which it is a part. As shown in FIGURE 2, each base has a transverse bore 34 and a chamber 35 through which a shaft 30 extends and in which a member 36 is slidably confined. A stem 37, connected to the member 36, extends through the bore 34 and through a smaller bore 38 in an end of the base which has an adjacent socket 39. A knob 40, fast on the exposed end of the stem 37, has a pin 41. The member 36 has an arcuate face 36A provided with threads thus to establish an operative engagement with the appropriate shaft 30 when in engagement therewith. A spring 43 within the bore 34 yieldably urges the member 36 into operative shaft engagement when the pin 41 is within the socket 39. The operator may disengage either base 28 by pulling, by means of its knob 40, its member 36 out of shaft engagement and that base may be held disengaged by so turning that knob as to prevent the pin 41 from again entering its socket 39. The piston supported by the thus disengaged base may then be adjusted within its cylinder to provide a desired piston position relative thereto.

The cylinder 24 of the pumping unit 22 has stirring means, generally indicated at 42 carried by its piston 26, an inlet 43 and an outlet 44 in its upper end and the cylinder 25 of the pumping unit 23 has an outlet 45 in its upper end placed in communication with the inlet 43 of the pumping unit 22 by a conduit 46.

The cylinder 24 of the pumping unit 22 establishes a chamber of a predetermined volumetric capacity and, in the use of the gradient pump, this chamber is filled with a first concentration of a substance, sucrose for example, and the cylinder 25 of the pumping unit 23 is provided with a suitable supply of a second concentration of that substance.

In use, the stirring means 42 are in operation and the motor 31 operates to effect the advance of the pistons 26 and 27. During such advance, the second concentration is continuously added, at a predetermined flow rate, to the stirred volume in the chamber of the pumping unit 22 and the thoroughly mixed concentrations continuously displaced through the outlet 44 and with the volumetric capacity of the chamber of the pumping unit 22 decreasing at a predetermined rate. Because the ratio provided by the gears 32 and 33 is greater than one-to-one, the flow rate of the pumping unit 23 is greater than the rate at which the volumetric capacity of the chamber of the pumping unit 22 is decreased, the displaced mixed concentrates are exponential gradients.

In FIGURES 3–5, different embodiments of the gradient pumps are schematically shown to illustrate different drives. As these embodiments are shown as modifications of the gradient pump just described, the same reference numerals are used to designate the corresponding parts but these are distinguished by suffix additions, the suffix addition A in the case of FIGURE 3, the suffix addition B in the case of FIGURE 4, and the suffix addition C in the case of FIGURE 5.

The gradient pump 20A shown in FIGURE 3 is identical to that shown in FIGURE 1 except that the gears 32A and 33A are of the same size and are both in mesh with a common drive gear 47. The resulting gradients are, accordingly, linear as the volumetric capacity of the pumping unit 22A is decreased at the rate at which the pumping unit 23A is delivering its concentration thereto. In addition, the gradient pump 20A is shown as having its cylinders 24A and 25A provided with jackets 48 so that a suitable refrigerant may be circulated through them.

The gradient pump 20B shown in FIGURE 4 differs in that the volumetric capacity of the chamber 24B for the first concentration remains unchanged during the operation of the gradient pump. While the gradient pump may have a chamber for the first concentration without means for decreasing its volumetric capacity, the pumping unit 22B is shown as having its piston 26B detached from the operating means and held against movement.

In the embodiment of FIGURE 5, a different flow rate is illustrated by providing a first pumping unit 22C of the gradient pump 20C that is of a diameter less than that of the pumping unit 23C but with their pistons advanced together at the same rate with exponential gradients resulting.

It will also be appreciated that the volume of the chambers may be adjusted prior to pump operation by adjusting the position of the piston relative to the cylinders and that any pump in accordance with the invention may have its pumping units refrigerated. Reference is made to FIGURE 6 wherein a linear gradient is graphically illustrated at 49 and an exponential gradient similarly indicated at 50.

The stirring means 42 are detailed in FIGURE 7. A Teflon coated magnetic stirring member 51 is located within a recess 52 in the upper surface of the piston 26 which also has a recess 53 in its undersurface in which there is located a permanent magnet 54 of the bar type fixed on the shaft 55 of a motor 56 so that as the magnet 54 turns, the stirring member 51, magnetically coupled thereto, turns therewith.

The stirring means shown in FIGURE 8 is generally similar to that shown in FIGURE 7 and its corresponding parts are designated by the same reference numerals distinguished by the suffix addition D. The stirring means 42D consist of a non-magnetic stirring member 51D in the recess 52D with a bushing 57 extending downwardly into the recess 53D. The member 51D is connected to a semi-permanent magnet 58 through the bushing 57. A ring magnet 59 surrounds the magnet 58 and is rotated by the motor 56D.

Another embodiment of the stirring means is illustrated in FIGURE 9 and as it involves some of the same features as those previously described, corresponding parts are indicated by the same reference numerals but with the addition of the suffix E. The stirring means 42E consists of a stirring member 51E in the form of an impeller in the recess 52E of the piston 26E. The motor 56E on the undersurface of the piston 26E is coupled directly to the impeller 51E by a shaft 55E sealed as at 60.

While the pumping units may be operated by separate means, the use of a single motor is preferred. Various drives may be employed and, one such other drive is shown in FIGURE 10, wherein the drive is shown as having piston operating cams 61 fast on the ends of the shaft of the motor 31F.

From the foregoing, it will be apparent that gradient pumps in accordance with the invention are well adapted to meet the requirements of enabling linear and exponential gradients to be accurately formed, even with highly viscous liquids, in large volumes as well as small and at rates that are high.

I claim:

1. The method of providing a continuously and regularly changing gradient of the difference between first and second concentrations of a substance that comprises the steps of continuously stirring a predetermined volume of one concentration, adding the other concentration thereto at a predetermined flow rate, and continuously displacing and collecting the stirred and mixed concentrations from that volume in a gradient maintaining form with the ratio between the displaced and added volumes being at least one-to-one.

2. The method of claim 1 in which the volume being stirred is maintained constant, the gradient being exponential in accordance with the equation being $$C_c = C_h + (C_o - C_h) e^{-\frac{V}{V_o}}$$

wherein $C_c$ is the gradient concentration, $C_h$ is the heavier concentration of the substance, $C_o$ is the lighter concentration thereof, $V_o$ is the predetermined volume, $e$ is a natural or Napierian logarithm of the approximate value of 2.71828, and V is the collected volume.

3. The method of claim 1 in which the predetermined volume is decreased by a predetermined flow rate other than that of the added concentration, the gradient being exponential in accordance with the equation then being $$C_c = C_h - \left[ (C_h - C_o)\left(1 - \frac{V}{2V_o}\right) \right]^{Rd}$$

wherein $C_c$ is the gradient concentration at the position of the collected volume, $C_h$ is the heavier concentration of the substance, $C_o$ is the lighter concentration thereof, $V_o$ is the predetermined volume, V is the collected volume, and $Rd$ is a ratio greater than one-to-one.

4. The method of claim 1 in which the predetermined volume is decreased at the predetermined flow rate of the added concentration, the gradient being linear in accordance with the equation $$C_c = C_h - \left[ (C_h - C_o)\left(1 - \frac{V}{2V_o}\right) \right]^{Rl}$$

wherein $C_c$ is the gradient concentration, $C_h$ is the heavier concentration of the substance, $C_o$ is the lighter concentration thereof, $V_o$ is the predetermined volume, V is the collected volume, and $Rl$ is the ratio of one-to-one.

5. A pump for delivering a continuously and regularly changing gradient of the differences between two different percentage concentrations of a substance, said pump comprising a chamber dimensioned to contain a predetermined volume of the liquid of one concentration, said chamber having an inlet and an outlet, means in communication with said inlet to deliver the other concentration to said chamber at a predetermined rate of flow, and means within said chamber to stir and mix the contents thereof before their displacement through the outlet.

6. The pump of claim 5 in which the pump includes means to decrease the volume of said chamber at a predetermined rate of flow.

7. The pump of claim 6 and drives for the volume decreasing means and for the means delivering said other concentration, both of said drives providing the same rate of flow.

8. The pump of claim 6 and means to operate the volume decreasing means and the means delivering said other concentration to provide flow rates different with respect to each other.

9. The pump of claim 8 and a common drive for both operating means.

10. A pump for delivering continuously and regularly changing gradients of two different concentrations of a substance, said pump including first and second pumping units each of the piston-cylinder type, the cylinder of the first unit having an inlet and an outlet and the cylinder of the second unit having an outlet in communication with the inlet of the first unit, the chamber of the first unit being dimensioned to contain a predetermined volume of one concentration and the chamber of the second unit being for the other concentration, means to operate said first unit to provide a predetermined flow rate, means to operate said second unit to provide a predetermined flow rate, and means in the chamber of the first unit to stir and mix the contents thereof before their discharge through the outlet of the first unit.

11. The pump of claim 10 and common means connected to the piston of each pumping unit and operable to advance them into their cylinders, each at a desired rate.

12. The pump of claim 10 and a cooling jacket for the cylinder of each pumping unit.

13. The pump of claim 10 in which the two pumping units are identical.

14. The pump of claim 10 in which the cross sectional area of one pumping unit is greater than the other and both pistons are advanced at the same rate.

15. A pump for delivering a continuously and regularly changing gradient of first and second different concentrations of a substance, said pump including first and second pumping units, the first unit being of the piston-cylinder type with its cylinder having an inlet and an outlet and dimensioned to contain a predetermined volume of one concentration and the outlet of the second unit being in communication with said cylinder inlet, means to operate said second unit to provide a predetermined flow rate of the second concentration into the first concentration, and means in the cylinder of the first unit to stir and mix the contents thereof before their discharge through the outlet of the first unit.

16. The pump of claim 15 and a cooling jacket for the cylinder of the first pumping unit.

References Cited
UNITED STATES PATENTS 1,393,953  10/1921  Miller _____ 103—204
2,210,366  8/1940  Godfrey et al. _____ 103—6 XR ROBERT M. WALKER, *Primary Examiner.*

U.S. Cl. X.R.

103—204; 259—7